Aug. 26, 1941. G. GUANELLA 2,253,975
DISTANCE DETERMINING SYSTEM
Filed May 27, 1939 3 Sheets-Sheet 1

INVENTOR.
Gustav Guanella
BY
Karl Nau
ATTORNEY.

Aug. 26, 1941.　　　　G. GUANELLA　　　　2,253,975
DISTANCE DETERMINING SYSTEM
Filed May 27, 1939　　　3 Sheets-Sheet 2

Fig. 4

INVENTOR.
Gustav Guanella
BY
ATTORNEY.

Aug. 26, 1941.    G. GUANELLA    2,253,975
DISTANCE DETERMINING SYSTEM
Filed May 27, 1939    3 Sheets-Sheet 3

INVENTOR.
Gustav Guanella
BY
ATTORNEY.

Patented Aug. 26, 1941

2,253,975

UNITED STATES PATENT OFFICE 2,253,975

DISTANCE DETERMINING SYSTEM

Gustav Guanella, Zurich, Switzerland, assignor to Radio Patents Corporation, a corporation of New York Application May 27, 1939, Serial No. 276,114
In Switzerland September 26, 1938

20 Claims. (Cl. 177—352)

The present invention relates to a method and apparatus for the measurement of distance by determining the time interval between the transmission and reception of wave energy projected against natural or artificial objects the distance of which from a given point is to be determined.

It has already become known to detect a reflecting object located at a distant point by transmitting wave energy towards the object and receiving the energy after reflection from the object. For this purpose it is possible to use either electromagnetic, mechanical or acoustic waves as well as alternating electric potentials.

According to one known method, the phase difference between transmitted and received sinusoidal oscillations serves as a means for determining the distance of the reflecting point or object. When using this method, the signals received from reflecting points whose distance is a multiple of a half wave length of the oscillations used will have equal time phase positions so that a unitary or positive distance measurement is not possible in this manner. Moreover, a portion of the transmitted energy may be directly received in addition to the reflected energy causing errors in the distance measurement by reacting upon the phase of the reflected energy.

According to another known method short signal impulses or wave trains are transmitted and received after reflection and the transition period of the signals utilized as a means for determining the distance. In employing this method, difficulties are encountered very frequently in efficiently segregating the reflected signal impulses from interfering signals received in most cases together with the desired impulses. Such arrangements, therefore, require considerable power for the transmitted impulses resulting in bulky and expensive transmitting apparatus.

An object of the present invention is to provide a new method and apparatus for distance measurement which is substantially free from the above disadvantages and drawbacks.

The invention proposes a novel apparatus and method for the determination and measurement of the distance of a reflecting object and with this aim in view generally involves the transmission of an oscillation mixture or complex wave of substantially constant energy content and being composed of a multiplicity of different frequencies the energies of which are small compared with the total energy of said wave such as is the case with acoustic wave energy known as noise or in case of a wave or oscillation having a frequency being wobbled at a high rate between a lower and upper limit as will be described in greater detail hereafter. This frequency mixture is received after reflection by the distant object and combined with locally retarded energy of the same character to form a modulation product containing a component being substantially proportional to the deviation between the transition period of the reflected energy and the retarding period of the locally delayed energy.

By a method of this type substantially all the disadvantages inherent in the previously known methods for distance determination involving the reception of reflected wave energy are substantially overcome. Due to the use of an oscillation mixture or complex wave comprising components of different frequencies the reflected oscillations are free from signals recurring at short intervals and liable to give rise to confusion, thus enabling a positive distance measurement. Moreover, due to the continuous transmission of wave energy of constant amplitude the required power is substantially reduced compared with methods employing short impulse signals, while at the same time enabling an interfering signal to be readily recognized and suppressed by virtue of the continuous indication or output response.

Further objects and advantages of the invention will become more apparent from the following detailed description of several embodiments thereof illustrated by the accompanying drawings forming part of this specification and wherein.

Similar reference characters identify similar parts and magnitudes throughout the different views of the drawings.

The novel aspects and function of the invention will become further apparent from the following theoretical discussion.

The complex wave or oscillation mixture to be transmitted to and reflected from the distance object may be represented by the following theoretical expression:

$$r_0 = \sum_{(n)} a_n \cos(w_n t - u_n) \quad (1)$$

wherein $a_n$ represents the amplitude, $w_n$ the frequency in radians per second, and $u_n$ the time phase position of the $n$th component of the transmitted frequency band or mixture. The path traveled by the oscillations between the transmitter and receiver is equal to twice the distance between the transmitter or receiver and the reflecting point. From this it follows that the transition time $T_1$, assuming a velocity of propagation $c$, is determined as follows:

$$T_1 = 2d/c \quad (2)$$

The received oscillations are then represented by the following expression, not considering a constant factor determined by the conditions of propogation:

$$r_1 = \sum_{(n)} a_n \cos[w_n(t - T_1) - u_n] \quad (3)$$

In addition, the oscillation mixture $r_0$ is directly passed through a retarding device having an inner transition or delay period $T_2$. These delayed oscillations are accordingly represented by the following expression:

$$r_2 = \sum_{(n)} a_n \cos[w(t - T_2) - u_n] \quad (4)$$

wherein amplitude variations by a constant amount have not been considered as being immaterial for the function of the invention. If the two oscillation mixtures $r_1$ and $r_2$ are equal to each other it follows that the outer and inner transition periods $T_1$ and $T_2$ will also be equal. Since $T_2$ is known when using a calibrated retarding device, $T_1$ will also be known and the distance $d$ may be determined in accordance with Equation 2 provided that the velocity of propagation $c$ is known.

The adjustment to equality of $r_1$ and $r_2$ is effected according to the invention by deriving from these oscillation mixtures a pair of corresponding signals or frequency bands $s_1$ and $s_2$, respectively, and combining the latter by a modulating or product forming process. The frequency bands $s_1$ and $s_2$ may for instance be derived from the oscillations $r_1$ and $r_2$, by amplification and translation through devices or circuits having linear propagation characteristics in such a manner that the relative phase differences between components of like frequency of the original mixtures $r_1$ and $r_2$ remain unchanged. The bands $s_1$ and $s_2$ are represented, therefore, by the following equations not considering any constant amplitude change:

$$s_1 = \sum_{(n)} a_n \cos[w_n(t - T_1) - u_n - p_n] \quad (5)$$

$$s_2 = \sum_{(n)} a_n \cos[w_n(t - T_2) - u_n - q_n] \quad (6)$$

In the foregoing equation, $p$ and $q$ represent additional phase shifts produced in the translating circuits. The effect of any such adidtional phase shift will disappear if:

$$p_n - q_n = 0 \quad (7)$$

The comparison of the bands $s_1$ and $s_2$ according to the invention is effected by forming a magnitude or potential being a product function $g$ of the two frequency bands as follows:

$$g = s_1 \cdot s_2 \quad (8)$$

This may be obtained in a simple manner by mutually modulating the frequency bands $s_1$ and $s_2$. The average or mean value $G$ derived from the modulation product $g$ obtained in this manner contains only portions originating from components of like frequency of the bands $s_1$ and $s_2$. This average value or control potential $G$ is represented, therefore, by the following expression, provided the condition of Equation 7 exists and without considering any constant factors dependent upon frequency:

$$G = \sum_{(n)} a_n^2 \cos[w_n(T_1 - T_2)] \quad (9)$$

This expression is a maximum for $T_1 = T_2$ since only in this case all $\cos[w_n(T_1 - T_2)]$ will simultaneously assume a maximum. With increasing difference between the transition periods the magnitude of $G$ will again decrease. By properly selecting the amplitudes $a_n$ as well as the frequencies $w_n$ it is possible to prevent formation of additional secondary maxima in addition to the above maximum, whereby $G$ will vary as a function of $T_1 - T_2$ as shown by the graph according to Figure 1. It is possible therefore by adjusting the control potential $G$ to a maximum to equalize the inner transition period with the outer transition period in a most simple and easy manner.

The frequency bands $s_1$ and $s_2$ may also be derived from $r_1$ and $r_2$ by heterodyning all the frequency components with an auxiliary frequency $v$ as represented by the following expressions:

$$s_1 = \sum_{(n)} a_n \cos[(w_n - v)t - w_n T_1 - u_n - p_n] \quad (10)$$

$$s_2 = \sum_{(n)} a_n \cos[(w_n - v)t - w_n T_2 - u_n - q_n] \quad (11)$$

It can be shown that in this case too the average value $G$ of the modulation product $g$ varies with the difference between the transition times $T_1 - T_2$ as represented by Equation 9 assuming equal additional phase shifts $p_n$ and $q_n$.

In special cases it may be desirable to produce a control potential $h$ varying in direct proportion both as to sense and magnitude to the difference between the inner and outer transition periods $T_1$ and $T_2$. For this purpose, according to a further feature of the invention, the additional phase shifts $p_n$ and $q_n$ of all corresponding component of the frequency bands $s_1$ and $s_2$ are adjusted to differ by 90° as represented by the following:

$$q_n - p_n = 90° \quad (12)$$

The mean value of the product $g = s_1 \cdot s_2$ is then obtained as follows:

$$H = \sum_{(n)} a_n^2 \sin[w_n(T_1 - T_2)] \quad (13)$$

Figures 1, 2:
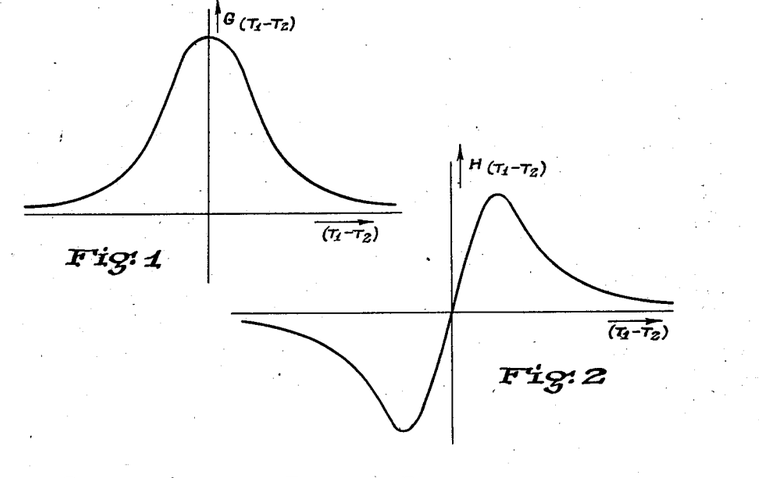
Figures 1 and 2 are graphs showing the variation of the output or control potential produced in accordance with the invention.

As is seen from this expression, the magnitude or potential $H$ in case of equality of both transition periods passes through zero and is directly proportional to small differences between the transition periods as long as $[w_n(T_1 - T_2)]$ may be substituted for $\sin[w_n(T_1 - T_2)]$. By proper choice of the amplitudes $a_n$ and the frequencies $w_n$ the potential $H$ will vary as shown in Figure 2 and will have no additional zero points thereby eliminating any ambiguities of the indication. The unequal phase shifts $p_n$ and $q_n$ according to Equation 12 may be obtained by the aid of suitable phase shifting devices or networks through which at least one of the frequency bands is transmitted. Any amplitude variations dependent on frequency obtained thereby may be taken into consideration as far as possible in the selection of the amplitudes of the oscillation mixture employed for transmission.

If the frequency bands are changed by superheterodyning, the 90° phase shift between the two frequency bands may be effected by employing a pair of beat oscillations of equal frequency but phase shifted relative to each other by 90°. By combination of the frequency mixtures $r_1$ and $r_2$ with these auxiliary or beating oscillations $\cos vt$ or $\sin vt$, respectively, and by eliminating one of the resulting side bands there are obtained frequency bands according to Equations 10 and 11 with the phases shifted in accordance with Equation 12 resulting in a direct current component H of the product $g$ as represented by the Expression 13.

If the output or control potential H varies as shown in Figure 2, a balance of the two transition periods is enabled in an especially easy manner due to the fact that the polarity of H indicates the sense in which the correction has to be made to effect equality between $T_1$ and $T_2$.

The control potential H corresponding to the mean value of the product of the frequency bands $s_1$ and $s_2$ is dependent to a large degree upon any phase position of the components of the frequency bands. A deviation of the phases from the condition according to Equation 12 may result in undesirable displacements of the zero point of the potential H. In case of oscillations having constant and invariant characteristics such a displacement may be taken into consideration in the calibration of the apparatus. The effect of phase rotation on the other hand may be eliminated by the provision of special phase compensating means in such a manner as to fulfill the requirement according to Equation 12 for the entire frequency range being employed. A false zero point of the control potential H due to undesirable phase shift may be practically avoided by employing the difference between the oscillation mixtures $r_1$ and $r_2$ to derive a frequency band serving as one factor in the product forming process. Thus, the first frequency mixture $s_1$ may be derived from the difference $r_1 - r_2$ by changing all frequencies by an amount $v$ and phase shifting all components by an amount $p_n$ as represented by the following expression:

$$s_1 = \sum_{(n)} a_n \{\cos [(w_n-v)t - w_n T_1 - u_n - p_n] - \cos [(w_n-v)t - w_n T_2 - u_n - p_n]\}$$

$$= +2\sum_{(n)} a_n \left[\sin (w_n-v)t - \frac{w_n}{2}(T_2+T_1) - u_n - p_n\right] \cdot \sin \left[\frac{w_n}{2}(T_2-T_1)\right] \quad (14)$$

The band $s_2$ may correspond to the expression according to Equation 11. The control potential H being the mean value of the product $s_1 \cdot s_2$ will then pass through zero if the transition periods $T_1$ and $T_2$ are equal even though the difference between the phase shifts $p_n$ and $q_n$ be no longer equal to 90°. In order to render the control potential H still further independent of phase errors produced in the receiving circuits and for unequal transition periods, it is advisable according to a further feature to employ the sum $r_1+r_2$ for producing the second frequency band $s_2$ which latter after frequency changing and phase rotation is therefore represented by the following expression:

$$s_2 = \sum_{(n)} a_n \{\cos [(w_n-v)t - w_n T_1 - u_n - q_n] + \cos [(w_n-v)t - w_n T_2 - u_n - q_n]\}$$

$$= 2\sum_{(n)} a_n \cos \left[(w_n-v)t - \frac{w_n}{2}(T_2+T_1) - u_n - q_n\right] \cdot \cos \left[\frac{w_n}{2}(T_2-T_1)\right] \quad (15)$$

The mean value of the product of the bands $s_1 \cdot s_2$ is then obtained as follows:

$$H = \sum_{(n)} a_n^2 \sin (q_n - p_n) \cdot \sin w_n (T_2 - T_1) \quad (16)$$

From the foregoing expression it is seen that small deviations of $(q_n - p_n)$ from 90° will not cause any appreciable change of the magnitude H and that larger phase deviations will result merely in a corresponding decrease of H whose zero point for $T_1 = T_2$ is maintained in all cases. As a result, an exact distance measurement is obtainable even when using amplifier and tuned circuits whose phase propagation characteristics are not exactly balanced. In carrying out this method the amplitudes $r_1$ and $r_2$ should be maintained substantially equal to each other such as by employing an automatic amplitude control (AVC) prior to the production of the sum and difference frequencies.

The control potentials G or H are obtained from the smoothened or filtered products of the bands $s_1$ and $s_2$; that is, they may be produced by mutual modulation of the frequency bands by means of any one of the known modulating devices or circuits adapted to form a product function output from a pair of impressed input potentials. There is especially suited for the purposes of this invention a bridge or ring modulation circuit (see $M_3$ in Figure 3) which has the advantage that in case of correct balance no other magnitudes or components are obtained in addition to the product $s_1 \cdot s_2$ proper. Moreover, push-pull or balanced modulator circuits may be employed for carrying out the invention such as shown at M in Figures 4 and 5 to be described later.

The magnitude corresponding to the smoothened or steady product obtained from the frequency bands $s_1$ and $s_2$ may also be utilized in the form of a mechanical force or torque and to this end various known devices may be employed for producing a control magnitude or indication wherein the product of a pair of applied electrical potentials or currents manifests itself in the form of a torque or deflection of a pointer or other member. Specially suited for this purpose are instruments or relays constructed in the manner of a watt meter or watt hour meter. As is known, a normal watt meter directly indicates the average product of the applied potentials. In case of a watt hour meter the mean product determines the speed of rotation of the movable element or rotor of the meter. In a device of the latter type, the speed varying according to Figure 2 may be regulated to zero by adjusting the retarding period $T_2$ whereby the rotor will come to a standstill.

According to a further feature of the invention, it is possible to generate a magnitude corresponding to the smoothened product of the frequency bands $s_1$ and $s_2$ without requiring a direct formation of the product of these frequency bands. Thus, for instance, the band $s_1$ may be amplitude modulated in accordance with a low frequency potential $n$. The thus obtained frequency band $s_3$ is modulated with $s_2$ resulting in a low frequency potential $n_3$ from which in turn there may be produced a magnitude or potential by product formation with the frequency $n$ which potential will correspond to the filtered product $s_1 \cdot s_2$. The product of the low frequencies $n$ and $n_3$ may be generated for instance in the form of a rotary movement by impressing potentials of these frequencies upon the fixed and rotatable coils, respectively, of an instrument constructed in the manner of a watt meter in which case the deflection of the meter will correspond to the magnitudes G or H, respectively.

In selecting the signals used for the transmission care should be taken that the oscillation mixture used is such that it cannot be completely decomposed into a fundamental and harmonic frequencies. If this were the case, the transmitted energy would constitute a periodic phenomenon resulting in additional maxima or minima of the control potential G or H obtained by mutual modulation for determined differences between the transition periods $T_1$ and $T_2$, respectively. An exception from this requirement exists if the oscillation period of the fundamental frequency is higher than the greatest transition period to be expected or if a unitary indication is ensured by special means.

The transmitted oscillations may comprise irregular components acoustically known as noise. Such oscillations may for instance be produced by amplifying the inherent noise voltage generated in electrical resistors or by vacuum tubes. If the amplitude spectrum of the oscillation mixture used does not comply with the several requirements for ensuring a unitary indication or response according to Figures 1 and 2, any undesirable components may be minimized and/or suppressed before the transmission and retardation or after reception and delay by means of tuned filters or by other suitable means.

According to a further feature it is possible to employ oscillations for the determination of reflecting objects which are periodic within short time intervals provided a constantly variable fundamental frequency is used such as a relaxation oscillation of variable oscillating periods or a frequency modulated sinusoidal oscillation comprising an extended freuqency band. From Equations 9 and 13 it is seen that the control potential G or H is independent of slow variations of the frequencies $w_n$ only if the transition periods $T_1$ and $T_2$ are equal. If, therefore, the frequency or frequencies of the transmitted oscillations are varied in accordance with a low frequency $w_1$, the control potential G or H will fluctuate in case of unequal transition periods $T_1$ and $T_2$ at the rate of this low frequency provided that the fluctuations are not suppressed by an excessive filtering action. The equality of both transition periods $T_1$ and $T_2$ when using oscillations of varying frequency for the distance determination may therefore be established in a simple and unequivocal manner by adjusting the invariant maximum or minimum of the control potential.

A characteristic of the novel method proposed by the invention is the fact that the control potentials G or H are constantly formed from the continuously received oscillations $s_1$ and $s_2$. As a result thereof momentary errors may be at once recognized or eliminated by sufficient filtering. Since the magnitude G or H according to Equations 9 and 13 is dependent upon the amplitudes $a_n$ of the received and retarded oscillations it is advantageous to maintain the average transmitted energy substantially constant in order to avoid unnecessary variations of the control potentials.

In order to receive only the reflected signal and to prevent a direct transmission from the transmitter to the receiver, it is advantageous to employ a directional transmitter and receiver with the latter arranged within a zone of minimum receptivity of the former. Alternatively, the directly received oscillations may be compensated by impressing a suitable portion of the transmitting energy upon the receiver in phase opposition to the energy directly picked up by the receiver. In some cases, however, it is not possible to prevent or compensate a direct excitation of the receiver by the transmitter. In this case, the received signals in addition to the oscillations retarded by a period $T_1$ will contain a non-retarded portion according to the following expression:

$$r_1 = \sum_{(n)} a_n \{\cos(w_n t - u_n) + \cos[w_n(t - T_1) - u_n]\} \quad (17)$$

By combination with $r_2$ in accordance with the proposed new method there is obtained the sum of two control potentials as follows:

$$G = G_{(T_1 - T_2)} + G_{(0 - T_2)} \quad (18a)$$

or $$H = H_{(T_1 - T_2)} + H_{(0 - T_2)} \quad (18b)$$

respectively, wherein the first portion is due to the reflected energy and the second portion is due to the directly transmitted energy. Both portions correspond to the Equations 9 and 13, respectively, and vary as shown by the graphs, Figure 1 and Figure 2. A disturbing influence of $G_{(0 - T_2)}$ or $H_{(0 - T_2)}$ may be avoided if these potentials are sufficiently small for the retarding periods $T_2$ to be dealt with. This condition may be complied with by the employment of sufficiently high frequencies for the transmitted oscillations whereby the oscillation period of all components is small compared with the existing transition periods.

In many practical cases there are several reflecting surfaces whereby $r_1$ is composed of several portions having different transition periods. Also the control potentials G or H are composed of corresponding components. A positive determination of the outer transition periods and the distance is possible in this case if the components of G or H which may vary as shown in Figures 1 and 2 disappear for a sufficiently small difference between the transition periods whereby that reflecting surface will contribute a component to the control potential whose transition period corresponds approximately with the adjusted retarding period. For this purpose, the period of oscillation of the waves employed for the distance measurement should be small compared with the differences between the transition periods for the several reflecting objects.

In general, interfering oscillations of foreign origin are received together with the reflected oscillations whereby the frequency spectrum of the interfering energies is obviously different from the spectrum of the transmitted oscillations. Due to the fact that the mean value of the product produced from two substantially different oscillatory phenomena is zero, the control potential obtained by the product formation after adequate filtering will not contain any components due to outside interference. A correct balance of the transition periods is therefore possible even though the amplitude of the disturbing signals be substantially greater than the amplitude of the reflected oscillations. In the same manner any interference produced in the amplifiers or receiving circuits such as noise potentials will be without any influence upon the control of the transition periods.

In order to receive the reflected oscillations with an amplitude as large as possible, it is advisable to concentrate the transmitting energy upon the reflecting point or object by using a directional transmitter. In many cases it is furthermore advisable to direct the reflected energy towards the receiver by the provision of suitable reflecting means such as hollow mirrors or the like. In place of a reflecting arrangement, a receiver controlling a transmitter may be arranged at the reflecting point whereby the oscillations are received and simultaneously re-transmitted with increased amplitude.

In general, the oscillation mixture or complex wave is transmitted to the reflecting object in its original form and then collected by the receiver. The transmission and reception however may be effected also by means of a carrier wave modulated at the transmitter and demodulated again at the receiver. This transmission is advisable if special advantages are obtained by employing a carrier wave of high frequency for the transmission.

Figure 3:
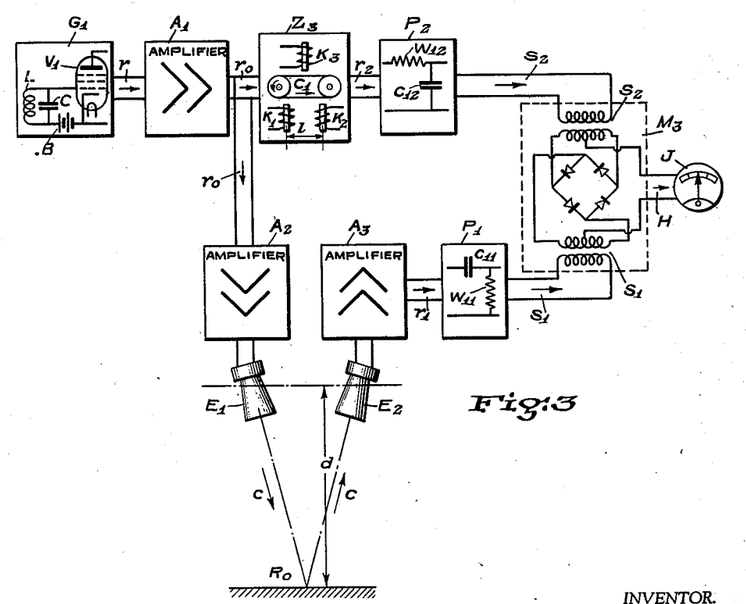
Figure 3 illustrates schematically a system for distance determination constructed according to the invention using acoustic or compressional waves transmitted to and reflected from the distant object.

Referring to Figure 3 of the drawings I have shown schematically a system constructed according to the invention using sound waves for determining the distance $d$ of a reflecting object or surface $R_0$ from a sound emitter $E_1$ such as a loud speaker and a sound receiver $E_2$ such as a microphone. The oscillation mixture used for transmission is generated by amplifying the internal noise potential in an electric circuit. In the example shown the oscillatory circuit L, C of an oscillator $G_1$, comprising a vacuum tube $V_1$ represents a high ohmic resistance R in the neighborhood of its resonance frequency in which case the noise voltage generated within the circuit is represented in a known manner by the following equation:

$$V = \sqrt{4kT_aRf} \quad (19)$$

wherein $T_a$ represents the absolute temperature, $k$ is a constant and $f$ represents the frequency. Item B is a source for biasing in a known manner the grid of the tube $V_1$. By amplification of the noise voltage V by the tube $V_1$, there is obtained a complex oscillation mixture $r$ which is further amplified by an amplifier of standard design $A_1$ to obtain an amplified complex wave or potential $r_0$. The latter is fed in part to the sound emitter $E_1$ through a further amplifier $A_2$ and in part to the retarding arrangement $Z_3$. The delay in $Z_3$ is effected in the example indicated by applying the oscillations to a magnet coil $K_1$ arranged adjacent to a moving magnetic wire or tape adapted to record the potential $r_0$ by corresponding variations of the magnetization of the recording wire. The magnetic record is picked up by a pick-up coil $K_2$ spaced from the recording coil $K_1$ by an adjustable distance $l$. In a device of this type, the retarding period $T_2$ in case of a traveling speed $c_1$ of the magnetic tape or wire is determined as follows:

$$T_2 = l/c_1 \quad (20)$$

There is further provided a quenching magnet $K_3$ to remove the magnetic record after passing the pick-up coil $K_2$ to enable a continuous recording and reproduction by the same endless tape or wire. As is understood any other delay or retarding device or circuit may be employed for the purpose of the invention. The sound waves transmitted by the emitter $E_1$ and reflected at $R_0$ are received by the receiver $E_2$ after the transition period $T_1$ according to the Equation 2. After amplification in $A_3$, the received oscillation mixture $r_1$ is applied to a phase shifting network $P_1$ which in the example shown comprises an ohmic resistance $W_{11}$ in series with a capacity $C_{11}$. Thus, the phase rotation $p$ is determined by the expression:

$$\tan p = \frac{1}{wC_{11}W_{11}} \quad (21)$$

The retarded oscillation mixture $r_2$ derived from the pick-up coil $K_2$ is applied to a further phase rotating network $P_2$ comprising a capacity $C_{12}$ in series with an ohmic resistance $W_{11}$ producing a phase shift $q$ determined by the expression:

$$\tan q = -wC_{12}W_{12} \quad (22)$$

The phase shift networks are designed in such a manner that:

$$C_{12}W_{12} = C_{11}W_{11} \quad (23)$$

that is; $\tan q = -\cot p$ or $q - p = 90°$. There are obtained in this manner by means of the phase shifting network $P_1$ and $P_2$ frequency bands $s_1$ and $s_2$ from the original oscillation mixtures $r_1$ and $r_2$, respectively, with the additional phase shifts $p$ and $q$ fulfilling the requirement according to Equation 12. As a result, a control potential H is obtained by the modulation varying as shown in Figure 2. The product of $s_1$ and $s_2$ in the example shown is produced by means of a bridge or ring modulating circuit comprising four rectifiers such as of the dry type connected to form a Wheatstone bridge with one of the signals $(s_1)$ applied to one pair of diagonal terminals of the bridge through a transformer $S_1$ and with the other signal $(s_2)$ impressed upon the remaining bridge terminal through a transformer $S_2$, the control potential H being derived from the center tap points of the transformer secondaries and applied to a suitable indicating or translating device such as a zero center type measuring instrument shown at J. In this manner the instrument J directly indicates small deviations between the outer transition period $T_1$ and the inner transition period $T_2$ both as to sense and magnitude. The balance of the transition periods is effected by varying the local retardation period such as by relatively displacing the coil $K_2$ of the retarding device $Z_3$ until the deflection of the indicator J and consequently the control potential H disappears. The distance $d$ from the reflecting object is then determined by the following equation as follows from the Expression 2 and 20:

$$d = \frac{c}{2c_i} \cdot l \quad (24)$$

An arrangement of the type described may be located upon an aircraft and serve as a terrain clearance indicator by constantly indicating the altitude of the craft above ground. Alternatively, $E_1$ and $E_2$ may represent a submarine sound transmitter and receiver for depth sounding on board ships. Finally, the invention may serve for prospecting purposes by transmitting the oscillations through solid ground by generating and sending out mechanical waves by means of an electro-mechanical converter at $E_1$ and receiving the waves reflected at $r_0$ by a suitable receiver $E_2$. The reflecting surface or object in this case may consists of a special geological formation such as an ore, water or oil deposit or the like.

If it is desired to measure the distance of a reflecting point in a definite direction, it is advisable to employ directional transmitting and receiving systems $E_1$ and $E_2$, respectively. This is true especially when determining the distance of an aircraft by transmitting radiant wave energy from the ground in a direction against the craft and receiving the energy reflected by the craft.

According to a further feature of the invention it is possible to employ a foreign noise source for producing the transmitting oscillation mixture in which case the noise generator $G_1$, the amplifiers $A_1$ and $A_2$ and the emitter $E_1$ may be dispensed with. In such cases it is only necessary to provide a second receiver and amplifier, in addition to the receiver $E_2$ and the amplifier $A_3$ serving for the reception of the reflected wave energy $R_1$, for receiving energy $r_0$ from the noise source to be applied to the retarding arrangement $Z_3$. As a foreign noise source, the motor and propeller noise may be employed in case of aircraft for altitude determination. If desired, however, a special noise generator may be used to improve the effectiveness and reliableness of the distance indication.

Figure 4:
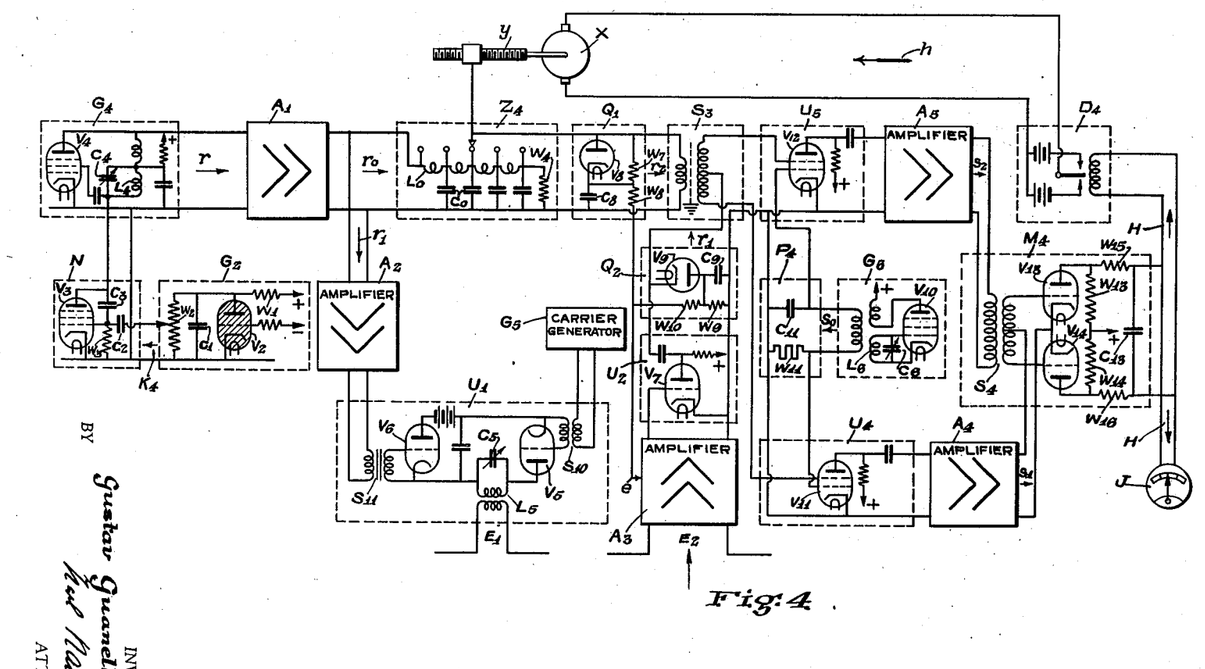
Figure 4 shows a distance measuring system including improved features according to the invention employing electro-magnetic waves for transmission to and reflection from a distant object.

In Figure 4 there is shown a further exemplification of an arrangement for distance measurement according to the invention designed to utilize electro-magnetic waves. In the example shown the oscillation mixture is produced by means of an oscillator $G_4$ of known type comprising a vacuum tube $V_4$ having associated therewith a tuned grid circuit $C_4$, $L_4$ arranged in regenerative connection with the output circuit. The frequency of this oscillator is constantly varied by means of the additional circuits or arrangements $G_2$ and $N$. The arrangement $G_2$ constitutes a known relaxation oscillator comprising a gas filled tube $V_2$ shunted by a capacity $C_1$ and having a resistance $W_1$ inserted in its anode circuit. In an arrangement of this character, after the condenser $C_1$ has been charged through the resistance $W_1$ to a potential equal to the breakdown potential of the tube, a gas discharge through the latter is initiated causing a discharge of the condenser. This phenomenon is periodically repeated resulting in the generation of a saw-tooth shaped relaxation potential a determined fraction $k_4$ of which is derived by means of a potentiometer resistance $W_2$ and impressed through a condenser $C_2$ upon the grid of a vacuum tube $V_3$ forming part of the arrangement $N$. In this manner the amplification of the tube $V_3$ is constantly varied in the rhythm of the relaxation potential $k_4$ produced in the circuit $G_2$. The anode of the tube $V_3$ is connected to its grid through a relatively large capacity $C_3$ and the grid in turn connected to the cathode through a small ohmic resistance $W_3$ in such a manner that the anode-cathode path of the tube represents a capacitative reactance varying in accordance with the degree of amplification; that is, in accordance with the instantaneous values of the relaxation potential $k_4$. The tube $V_3$ is connected in parallel to the oscillatory circuit $C_4$, $L_4$ to cause a constant variation of the frequency of the oscillator $G_4$ in the rhythm of the relaxation potential resulting in the production of an oscillation spectrum or frequency band $r$ employed for the distance determination. In place of the oscillating circuits $G_2$, $N$, $G_4$ any other generating system for producing a suitable frequency band may be provided for the purpose of the invention.

The varying oscillating frequency is amplified in $A_1$ and the mixture $r_0$ applied on the one hand to the transmitting circuits, amplifier $A_2$ and modulator $U_1$, and on the other hand to the retarding arrangement $Z_4$. The oscillations may be directly transmitted after sufficient amplification. In the exemplification shown transmission by means of a carrier wave is employed. For this purpose, the amplitude of the oscillations of a carrier frequency generator $G_5$ are modulated in the modulator-amplifier $U_1$ in accordance with the amplified potential $r_0$. For this purpose, the direct anode potential of the amplifying tube $V_5$ is varied in accordance with the potential $r_0$ by means of a further tube $V_6$ arranged in series with the anode high potential source and having a grid controlled by the output of the amplifier $A_2$ through an input transformer $S_{11}$. The modulated oscillatory energy is transmitted from the tuned anode circuit $C_5$, $L_5$ to a transmitting antenna such as a di-pole or the like shown at $E_1$. The reflected oscillations picked up by a receiving antenna $E_2$ after amplification in $A_3$ are demodulated by means of a suitable arrangement $U_2$ comprising a vacuum tube detector $V_7$ to produce the original potential $r_1$ in a manner well understood. The retarding arrangement $Z_4$ in the example shown consists of a plurality of series inductances $L_0$ and shunt capacities $C_0$ having successive tapping points. The retarded potential $r_2$ is derived from the tapping points of the retarding network by a variable contact member in a manner readily understood.

In order to produce frequency mixtures $s_1$ and $s_2$ in accordance with the Expressions 14 and 15 there is formed with the aid of a transformer $S_3$ the sum and difference of the potentials $r_1$ and $r_2$. The sum and difference potentials are combined in the circuits $U_4$ and $U_5$ with the frequency $s_0$ of a local oscillator $G_6$ to produce corresponding beat or intermediate frequencies as is customary in superheterodyne receivers. There is further shown at $P_4$ a phase shifting network comprising a reactive impedance such as condenser $C_{11}$ in series with an ohmic resistance $W_{11}$ connected to the oscillatory circuit $L_6$, $C_6$ of the oscillating tube $V_{10}$. The reactive potential drop developed by the condenser $C_{11}$ is impressed upon the grid of a mixer tube $V_{12}$ of the frequency changer $U_5$ and the ohmic potential drop developed across the resistance $W_{11}$ is impressed upon the grid of a mixer tube $V_{11}$ of the frequency changer $U_4$ whereby the sum and difference potential $r_1+r_2$ and $r_1-r_2$ are combined with local quadrature oscillations of like frequency to produce corresponding intermediate frequency potentials. In the amplifiers $A_4$ and $A_5$ one of the side bands of the combined and phase shifted potentials is suppressed whereby the frequency bands $s_1$ and $s_2$ obtained in the outputs of the amplifiers $A_4$ and $A_5$ will correspond to the Expressions 14 and 15. The frequency bands $s_1$ and $s_2$ are applied to a modulating circuit $M_4$ consisting in the example shown of a balanced modulator comprising a pair of vacuum tubes $V_{13}$ and $V_{14}$ with one of the signal bands impressed upon the grid of the tubes in opposite phase relation and with the other signal being impressed upon the grids in like phase in a manner understood from the foregoing. The anodes of the tubes are connected to the positive terminal of a high tension source through load impedances $W_{13}$ and $W_{14}$, respectively, whereby there is obtained between the anodes a control potential H applied to the indicator J after sufficient filtering such as by means of series impedances $W_{14}$ and $W_{15}$ and parallel capacity $C_{13}$.

The control potential H according to Expression 16 is independent of small phase deviations originating in the amplifiers $A_4$, $A_5$, the mixing circuits $U_4$, $U_5$, the phase shifting circuit $P_4$ and the modulation or mixer circuit $M_4$. For this purpose, however, the amplitudes of both oscillation mixtures $r_1$ and $r_2$ should be maintained at an equal value. To this end the potentials $r_1$ and $r_2$ are rectified by means of rectifiers $Q_1$ and $Q_2$ comprising diode tubes $V_8$ and $V_9$. The condensers $C_8$ and $C_9$ in series with the diodes are charged positive and negative, respectively, according to the instantaneous amplitudes of the potentials $r_1$ and $r_2$ whereby a direct potential is obtained at the junction point between the resistances $W_8$ and $W_{10}$ which direct potential corresponds to the amplitude difference between $r_1$ and $r_2$ both as to sense and magnitude. This potential $e$ serves to control the amplification of the amplifier $A_3$ in such a manner as to maintain equality between the amplitudes of $r_1$ and $r_2$.

As pointed out, the control potential H is fed to an instrument J indicating small differences in the transition periods both as to sense and magnitude. According to a further feature, there is provided a polarised relay $D_4$ energized by the control potential H and serving to control a servo-motor X to be started in either direction depending on the polarity of the output potential $h$ of the relay and operating the variable contact member of the retarding device $Z_4$ through a suitable transmission mechanism Y. In this manner the retarding period and outer transmission period are automatically balanced whereby the system may be used for direct or continuous distance indication by the provision of a suitably calibrated scale disposed in cooperating relation with a displaceable contact of the retarding device.

Figure 5:
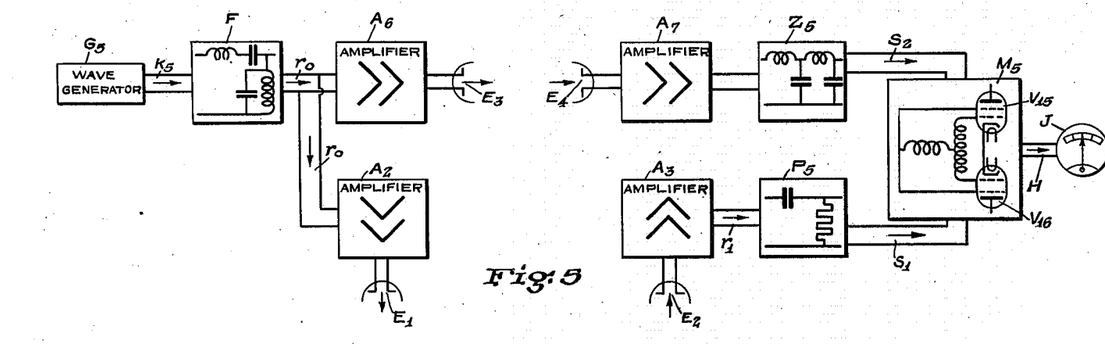
Figure 5 illustrates a modification of a system according to Figure 4.

Referring to Figure 5 there is shown an arrangement similar to the preceding figure wherein the transmitter and receiver are located at a greater distance from each other. The location of the receiver at a certain distance from the transmitter has the advantage that the amplitudes of the oscillations directly transmitted to the receiver are reduced relative to the amplitude of the reflected oscillations. There is shown in Figure 5 a generator $G_5$ for producing an oscillation mixture $k_5$ from which a desired spectrum is segregated by means of a filter F. The thus obtained oscillation potential $r_0$ to be employed for the distance measurement is amplified by the amplifier $A_2$ and fed to the directional transmitting antenna $E_1$. The oscillations absorbed by the directional receiving antenna $E_2$ are amplified in $A_3$ thereby obtaining a potential $r_1$ delayed by the transition period $T_1$ to and from the reflecting object. Due to the increased distance between the transmitter and receiver there is provided an additional radio transmission channel between the amplifiers $A_6$ and $A_7$ by means of an additional transmitter and receiver $E_3$ and $E_4$, respectively, whereby the potential variations $r_0$ are directly applied to the retarding device $Z_5$. The thus obtained frequency mixture $s_2$ retarded by a period $T_2$ comprising the transmission time from $E_3$ to $E_4$ and the delay period of the retarding device $Z_5$ is directly applied to the modulating arrangement $M_5$. The potential $r_1$ is also directly applied to the modulating circuit if a control potential G is desired varying according to Figure 1. By the insertion of a phase shifting circuit $P_5$ adapted to change the time phase position of all components by 90° a control potential H is obtained as a result of the modulation in $M_5$ varying as shown in Figure 2. This potential is indicated by the instrument J in the manner similar as described hereinbefore. The modulating circuit $M_5$ may be of any suitable type such as a balanced modulator comprising vacuum tubes $V_{15}$ and $V_{16}$ as indicated.

Figure 6:
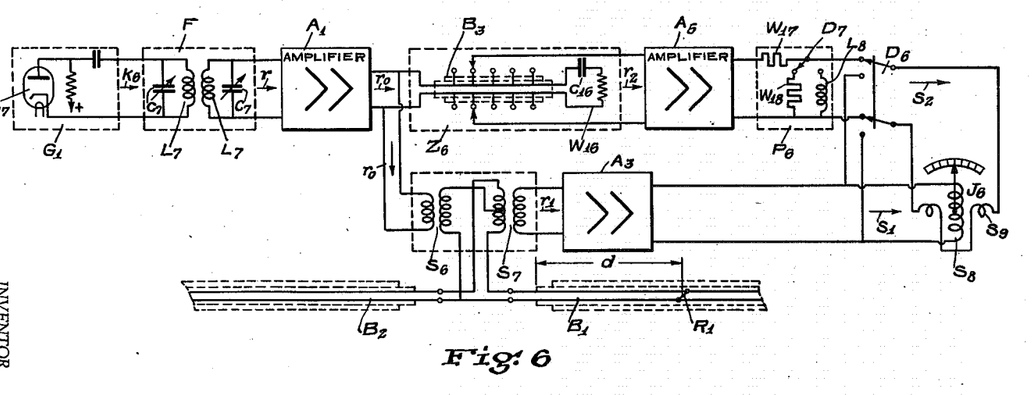
Figure 6 illustrates a further application of the invention for locating a short circuit in an electric transmission line or cable.

There is further shown in Figure 6 an exemplification of the invention for locating a reflecting point such as a short circuit in an electric line or cable. There is provided as oscillation generator $G_1$ a vacuum tube $V_{17}$ for generating a noise potential by the so-called "shot effect" of the tube. From the generated potential $k$ a suitable frequency mixture $r$ is segregated by means of a filter $f$ such as a band-pass filter as shown comprising a pair of coupled tuned circuits $C_7$, $L_7$. The potential $r$ is amplified in $A_1$ and the amplified potential $r_0$ fed on the one hand into a cable $B_1$—$B_2$ through a transformer $S_6$ and on the other hand to a retarding arrangement $Z_6$. The oscillations are propagated through the cable in both directions and reflected at a short circuit point $R_1$ in the section $B_1$ at a distance $d$ from the transmitting point. The reflected oscillations $r_1$ are applied through a transformer $S_7$ to an amplifier $A_3$ and serve as the first frequency mixture $s_1$ impressed upon the movable coil $S_8$ of a watt meter indicator $J_6$. The potential $r_2$ delayed by the retarding device $Z_6$ is passed through amplifier $A_5$ to the circuit $P_6$ comprising a pair of ohmic resistances $W_{17}$ and $W_{18}$ forming a potential divider in the position of the switch $D_7$ shown in the drawings. In the latter case the frequency mixture $s_2$ is fed through the switch $D_8$ to the fixed coil $S_9$ of the indicator $J_6$. The deflection of the indicator is dependent upon the mean product of the instantaneous values of the applied potentials; that is, to the control magnitude G varying according to Figure 1 and becoming a maximum in case of equality of the inner retardation period $T_2$ through $Z_6$ and the outer transition period $T_1$ of the oscillations reflected in the cable. By means of a further switch $D_7$ the resistance $W_{18}$ may be replaced by an inductance coil $L_8$ having a reactance for the frequencies being transmitted which is small relative to the impedance of $W_{17}$. In this case all components of $S_2$ are shifted in phase by 90° whereby the control magnitude indicated by $J_6$ varies as shown in Figure 2; that is, the deflection is proportional to small differences between the transition periods both as to sense and magnitude. By changing the position of the switch $D_8$ the reflected oscillations may be simultaneously impressed upon the fixed and movable coil of $J_6$ whereby the instrument will indicate the mean square value of these oscillations.

In order to balance the inner and outer transition periods in arrangements according to the invention, it is advisable to use a retarding arrangement whose transition periods are dependent upon frequency in a like manner as the transition periods of the outer transmission. The transition periods in the case of sound waves or electro-magnetic waves are practically independent of frequency. In such cases as shown in Figures 3, 4, 5 it is desirable that also the retarding periods of Z should be independent of frequency; that is, the retarding arrangements should cause phase shifts in proportion to the frequencies. Since the transition periods in a wire line or cable are usually dependent to a large extent upon frequency it is advisable to employ a retarding arrangement $Z_6$ in Figure 6 having the form of a tapped line or artificial network $B_3$ having similar phase transmission characteristics as the cable $B_1$ to be tested.

As will be evident from the foregoing, the invention is not limited to the specific arrangements and details shown and described herein for illustration but that the underlying principle and novel concept of the invention are susceptible of numerous embodiments and modifications coming within its broad scope and spirit as defined in the appended claims. The specification and drawings are accordingly to be regarded in an illustrative rather than a limiting sense.

I claim:

1. A distance determining system comprising means for producing a complex wave having a substantially constant amplitude and being constituted by a multiplicity of energy components of different frequency the energies of which are small compared with the total energy content of said wave, means for transmitting a portion of said wave to a distant point, means for receiving the wave reflected from said point, adjustable means for variably imparting substantially equal time delays to all the components of another portion of said wave, means for combining the received and delayed waves to produce a product function resultant magnitude, and means for utilizing the direct component of said magnitude for indicating the distance of said point by said adjustable delay means.

2. A distance determining system comprising means for producing a complex wave having a substantially constant amplitude, means for transmitting a portion of said wave to a distant point, means for collecting the wave reflected from said point, adjustable delay means for variably imparting substantially equal time delays to all the frequency components of another portion of said wave, means for combining the received and delayed waves to produce a product function resultant magnitude, and means for utilizing the average value of said magnitude for indicating the distance of said point by said adjustable delay means, said wave being constituted by a multiplicity of energy components of different frequency and having amplitudes so related as to obtain a unitary distance indication substantially independently of the relation between the oscillating periods of said components and the traveling time of said wave to and from said point.

3. A distance determining system comprising means for producing a complex wave of substantially constant amplitude, means for transmitting a portion of said wave to a distant object, means for receiving the wave reflected from said object, adjustable delay means for imparting substantially equal time delays to all the frequency components of another portion of said wave, means for relatively phase shifting the components of like frequency of the received and delayed waves by 90°, further means for combining the phase shifted waves to produce a product function resultant magnitude, and means for utilizing the disappearance of the average value of said resultant magnitude to indicate the distance of said object by said adjustable delay means, said wave being constituted by a multiplicity of energy components of different frequency and having amplitudes related so as to obtain a unitary distance indication substantially independently of the relation between the oscillating periods of said components and the traveling time of said wave to and from said object.

4. A distance determining system comprising means for producing a complex electric wave of substantially constant amplitude, means for transmitting a portion of said wave to a distant point, means for receiving the wave reflected from said point, adjustable means for imparting substantially equal time delays to all the frequency components of another portion of said wave, a modulating device with means for applying thereto the received and delayed waves for mutually intermodulating one wave with the other wave, and means for utilizing the average magnitude of the intermodulation product for indicating the distance of said object by said adjustable delay means, said electric wave being constituted by a multiplicity of components of different frequency, at least part of which are in non-harmonic relation and the frequencies and amplitudes of all components of said wave being related to obtain a unitary distance indication substantially independently of the relation between the oscillating periods of said components and the traveling time of said wave to and from said object.

5. A distance determining system comprising means for producing a complex electric wave, means for transmitting a portion of said wave to a distant object, means for receiving the wave reflected from said object, adjustable delay means for imparting substantially equal time delays to all the frequency components of another portion of said wave, means for producing a 90° phase shift between components of like frequency of the received and delayed waves, a modulating device having a pair of input circuits with means for applying thereto said phase shifted waves to mutually intermodulate one wave by the other wave, and means arranged to be controlled by the direct component of the intermodulation product produced by said device to actuate said delay means in dependence upon the sense and magnitude of said direct component, said electric wave being constituted by a multiplicity of components of different frequencies at least part of which are in non-harmonic relation and the frequencies and amplitudes of all said components being so related as to obtain a substantially unitary distance indication by said delay means when said direct component becomes zero.

6. A distance determining system comprising means for producing a complex wave of substantially constant amplitude, means for directionally transmitting a portion of said wave to a distant object, means for directionally receiving the wave reflected from said object, adjustable delay means for imparting substantially equal time delays to all the frequency components of another portion of said wave, means for combining the received and delayed waves to produce a product function resultant magnitude, and means for utilizing the average value of said magnitude to indicate the distance of said object by said adjustable delay means, said wave being constituted by a multiplicity of components of different frequency having energies which are small compared with the total energy of said wave and at least part of which components are in non-harmonic relation.

7. A distance determining system comprising means for producing a complex wave of substantially constant amplitude, means for transmitting a portion of said wave to a distant object, means for receiving the wave reflected from said object, adjustable delay means for imparting substantially equal time delays to all the frequency components of another portion of said wave, means for producing local oscillations, means for combining the received and delayed waves with said local oscillations to produce a pair of beat frequency waves, further means for combining said beat frequency waves to produce a product function resultant magnitude, and means for utilizing the average value of said resultant magnitude to indicate the distance of said object by said adjustable delay means, said wave being constituted by a multiplicity of energy components of different frequency and having energies which are small compared with the total energy content of said wave to obtain a substantially unitary distance indication.

8. A distance determining system comprising means for producing a complex wave of substantially constant amplitude, means for transmitting a portion of said wave to a distant object, means for receiving the wave reflected from said object, adjustable delay means for imparting substantially equal time delays to all the frequency components of another portion of said wave, means for producing a pair of local oscillations of like frequency and having a relative phase angle of 90°, means for combining each of the received and delayed waves with one of said local oscillations to produce beat frequency waves, further means for combining said beat frequency waves to produce a product function resultant magnitude, and means responsive to the average value of said magnitude to indicate the distance of said object by said adjustable means, said wave being constituted by a multiplicity of energy components of different frequencies having energies which are small compared with the total energy content of said complex wave to obtain a substantially unitary distance indication.

9. A distance determining system comprising means for producing a complex wave comprising a fundamental oscillation wobbulated between upper and lower frequency limits at the rate of an auxiliary frequency, means for transmitting a portion of said wave to a distant object, means for receiving the wave reflected from said object, adjustable delay means for imparting substantially equal time delays to all the frequency components of another portion of said wave, means for combining the received and delayed waves to produce a product function resultant magnitude, and means for utilizing the average value of said magnitude to indicate the distance of said object by said adjustable delay means.

10. A distance determining system comprising means for producing acoustic noise energy of substantially constant amplitude, means for transmitting a portion of said energy to a distant object, means for receiving the energy reflected from said object, adjustable delay means for imparting substantially equal time delays to all the frequency components of another portion of said energy, means for combining the received and delayed energies to produce a product function resultant magnitude, and means for utilizing the average value of said resultant magnitude to indicate the distance of said object by said adjustable delay means.

11. A distance determining system comprising means for producing complex electric wave energy of substantially constant amplitude, means for converting a portion of said energy into radiant energy having like frequency and phase characteristics, means for transmitting the converted energy to a distant object, means for receiving the energy reflected from said object, means for reconverting the received energy into electrical energy of like frequency and phase characteristics, adjustable retarding means for imparting substantially equal time delays to all the frequency components of another portion of said electric wave energy, further means for combining the delayed and converted energies to produce a product function resultant magnitude, and means for utilizing the average value of said resultant magnitude to indicate the distance of said object by said adjustable delay means, said wave energy being constituted by a multiplicity of components having different frequencies and energies which are small compared with the total energy content of said wave and at least part of said frequency components having a non-harmonic relation.

12. A distance determining system comprising a generator for producing a complex electric wave of substantially constant magnitude, an emitter adapted to transmit radiant energy to a distant object, means for modulating the transmitted energy in accordance with variations of said electric wave, means for receiving and demodulating the energy reflected by said object to reproduce the original electric wave, adjustable retarding means for imparting substantially equal time delays to all the frequency components of a portion of said electric wave, a modulator energized by the demodulated and delayed waves to produce a resultant intermodulation product including a direct component varying in proportion to deviation between the transit time of the radiant energy to and from said energy and the delay period of said retarding means, and further means for utilizing said direct component for adjusting said delay means to a point indicative of the distance of said object, said electric wave being constituted by a multiplicity of components of different frequencies having energies which are small compared with the total energy content of said wave and at least part of which are in non-harmonic relation.

13. A distance determining system comprising a generator for producing a complex electric wave, a carrier wave transmitter adapted to transmit radio waves towards a distant object, means for modulating said radio waves in accordance with the variations of said wave, a receiver for receiving the radio waves reflected from said object, said receiver including demodulating means to reproduce the original electric wave, adjustable retarding means for imparting substantially equal time delays to all the frequency components of a portion of said electric wave, a source of local oscillations, means for combining the demodulated and delayed waves with said local oscillations to produce beat frequency waves, a modulating device energized by said beat frequency waves to produce a resultant intermodulation product including a direct component varying in proportion to the departure of the transit time of said radio waves to and from said object from the delay period of said retarding means, and means for utilizing said direct component for adjusting said delay means to a point indicative of the distance of said object, said electric wave being constituted by a multiplicity of components of different frequencies having energies which are small compared with the total energy content of said electric wave and at least part of which are in non-harmonic frequency relation.

14. A distance determining system comprising a generator for producing a complex electric wave of substantially constant energy content, a carrier wave transmitter for transmitting radio waves to a distant object, means for modulating said radio waves in accordance with the variations of said electric wave, a receiver for receiving the radio waves reflected from said object, said receiver including demodulating means to reproduce the original electric wave, adjustable retarding means for imparting substantially equal time delays to all the frequency components of a portion of said electric wave, means for producing a pair of local oscillations of equal frequency but relatively phase shifted by 90°, means for combining each of the demodulated and delayed waves with one of said local oscillations to produce beat frequency waves, means energized by said beat frequency waves to produce a resultant intermodulation product including a direct component which varies in sense and magnitude in proportion to the departure of the delay period of said retarding means from the transit time of said radio waves to and from said object, whereby for zero departure the adjusting point of said retarding means will be indicative of the distance of said object, said electric wave being constituted by a multiplicity of components of different frequencies having energies which are small compared with the total energy content of said electric wave, and at least part of which are in non-harmonic frequency relation.

15. A method of determining the distance of a remote point comprising the steps of generating a complex wave being constituted by a multiplicity of frequency components the energies of which are small compared with the total energy content of said wave, transmitting a portion of said wave to said point, receiving the wave reflected from said point, locally imparting substantially equal time delays to all the frequency components of another portion of said wave, combining the reflected and delayed waves to produce a product function resultant magnitude, producing a control magnitude proportional to the average of said resultant magnitude, and varying the local delay period until reaching a predetermined value of said average magnitude.

16. A distance determining system comprising means for producing a complex electric wave of substantially constant amplitude, means for transmitting a portion of said wave to a distant point, means for receiving the wave reflected from said point, adjustable means for imparting substantially equal time delays to all of the frequency components to another portion of said wave, an electric dynamometer device having a pair of magnet coils and a movable member actuated by said coils, means for exciting one of said coils by energy derived from said received wave and for exciting the other coil by energy derived from the locally delayed wave to deflect said member proportionally to the average product of said waves to indicate the distance of said point by the adjustment of said delay means in dependence upon the deflection of said member, said electric wave being constituted by a multiplicity of components of different frequencies at least part of which are in nonharmonic relation and the frequencies and amplitudes of all said components being so related as to obtain a substantially unitary distance indication by said delay means when said direct component has a predetermined value.

17. A distance determining system comprising means for producing a complex electric wave, means for transmitting a portion of said wave to a distant object, means for receiving the wave reflected from said object, adjustable delay means for imparting substantially equal time delays from all the frequency components of another portion of said wave, means for producing a 90° phase shift between components of like frequency of the received and delayed waves, a modulating device having a pair of input circuits with means for applying thereto said phase shifted waves to mutually intermodulate one wave by the other wave, a servo-motor arranged to operate said delay means, and means for controlling the rotation of said motor in proportion to the direct current component of the intermodulation product of said waves, said electric wave being constituted by a multiplicity of components of different frequencies at least part of which are in non-harmonic relation and the frequencies and amplitudes of all said components being so related as to obtain a substantially unitary distance indication by said delay means when said direct component becomes equal to zero.

18. A method of determining the distance of a remote point comprising the steps of generating a complex electric wave of substantially constant amplitude and being constituted by a multiplicity of frequency components the energies of which are small compared with the total energy content of said wave and at least part of which components are in non-harmonic relation, transmitting a portion of said wave to said point, receiving the wave reflected from said point, locally imparting substantially equal time delays to all the components of another portion of said wave, intermodulating the delayed and reflected waves to produce a product function resultant magnitude, producing a control magnitude proportional to the average of said resultant magnitude, and varying the local delay period until obtaining a predetermined value of said control magnitude.

19. A distance determining system comprising means for producing a complex electric wave, means for transmitting a portion of said wave to a distant point, means for receiving the wave reflected from said point, adjustable delay means for imparting substantially equal time delays to all the components of another portion of said wave, means for adding and subtracting said reflected and delayed waves to produce sum and difference waves therefrom, means for intermodulating said sum and difference waves to form a product function magnitude, and means for utilizing the average magnitude of the intermodulation product for indicating the distance of said point by said adjustable delay means, said electric wave being constituted by a multiplicity of components of different frequencies at least part of which are in non-harmonic relation and the frequencies and amplitudes of all of said components being related to obtain a unitary distance indication substantially independently of the relation between the oscillating periods of any of said components and the travelling time of said wave to and from said object.

20. A distance determining system comprising means for producing a complex electric wave, means for transmitting a portion of said wave to a distant object, means for receiving the wave reflected from said object, adjustable delay means for imparting substantially equal time delays to all the frequency components of another portion of said wave, means for equalizing the amplitudes of the received and delayed waves, further means for adding and subtracting the received and delayed waves to produce sum and difference waves, means for producing a pair of local oscillations having a 90° phase relation, means for combining each of said sum and difference waves with one of said local oscillations to produce a pair of beat frequency waves, means for intermodulating said beat frequency waves to produce a product function resultant magnitude, and means for utilizing the average magnitude of the intermodulation product for indicating the distance of said point by said adjustable delay means, said electric wave being constituted by a multiplicity of components of different frequencies at least part of which are in non-harmonic relation and the frequencies and amplitudes of all components of said wave being related to obtain a unitary distance indication substantially independently of the relation between the oscillating periods of any of said components and the travelling time of said wave to and from said object.

GUSTAV GUANELLA.